United States Patent
Jackson

(10) Patent No.: US 11,584,302 B2
(45) Date of Patent: Feb. 21, 2023

(54) DRIVER ACCESS ASSIST

(71) Applicant: Mark V. Jackson, Sevierville, TN (US)

(72) Inventor: Mark V. Jackson, Sevierville, TN (US)

( * ) Notice: Subject to any disclaimer, the term of this patent is extended or adjusted under 35 U.S.C. 154(b) by 24 days.

(21) Appl. No.: 17/152,322

(22) Filed: Jan. 19, 2021

(65) Prior Publication Data
US 2022/0227298 A1 Jul. 21, 2022

(51) Int. Cl.
*B60R 3/02* (2006.01)
*B60R 3/00* (2006.01)

(52) U.S. Cl.
CPC .............. *B60R 3/007* (2013.01); *B60R 3/02* (2013.01)

(58) Field of Classification Search
CPC .................................. B60R 3/02; B60R 3/007
See application file for complete search history.

(56) References Cited

U.S. PATENT DOCUMENTS

| 8,720,924 | B2* | 5/2014 | Ruehl | B60R 3/00 280/166 |
| 11,105,152 | B1* | 8/2021 | Joldersma | B60R 3/005 |
| 2002/0003340 | A1* | 1/2002 | Hallquist | B60R 3/02 280/163 |
| 2021/0300248 | A1* | 9/2021 | Whiteman | B60R 19/48 |

* cited by examiner

*Primary Examiner* — Bryan A Evans
(74) *Attorney, Agent, or Firm* — Blanchard Horton PLLC

(57) ABSTRACT

A step assembly to be attached to a crossbar of a vehicle, the step assembly including a base subassembly including first and second side brackets configured to be coupled to an upper surface of a crossbar of a vehicle, and a stair subassembly including a plurality of step members arranged between first and second side members, wherein proximal ends of each of the first and second side members are configured to be rotatably coupled to the respective first and second side brackets such that the stair subassembly is selectively rotatable between a deployed position and a stored position.

18 Claims, 8 Drawing Sheets

DRIVER ACCESS ASSIST

CROSS-REFERENCE TO RELATED APPLICATIONS

Not applicable.

FIELD OF INVENTION

The present general inventive concept relates to step apparatuses, and, more particularly, to attachable step assemblies that are mountable to a vehicle crossbar.

BACKGROUND

Over the road (OTR) semi-truck drivers, in general, are part of a demographic that, like many in the country, is aging. Due to the aging process access to the standard trucking rig (a tractor that pulls a trailer of various types) is becoming more of a challenge, especially when access is required multiple times a day. Most trailer frames are designed with several pieces of steel located at the rear of the trailer, each having its own purpose. These pieces include a lower crossbar, which prevents a vehicle following the truck from running up under the trailer, and vertical members which support the lower crossbar or central panel for the same purpose. This central area at the rear of the truck is also used by warehouse facilities to lock the trailer down, which prevents the trailers movement while unloading freight. There is also a rear base perimeter of the trailer support structure, which also houses the trailer lights and license plate. Most trailer decks are from 46 to 48 inches above the ground or driving surface, and the first step-up onto the truck frame at the rear of the truck can be from 20 to 26 inches, oftentimes without a proper hand hold to stabilize the vertical climb, presenting an unsafe access. Jumping up and down at the rear of a truck trailer can lead to significant straining of the human body, especially when one has to perform such actions multiple times a day, and these activities can also initiate higher work compensation claims due to resultant injuries to the knee, hip, and ankle joints of a typically older demographic of drivers.

A number of devices and configurations are known in the art that include a detachable or retractable step apparatus to assist in accessing a vehicle or a part of a vehicle, such as the bed of a flatbed trailer. Some of these devices and configurations known in the art are summarized below.

U.S. Pat. No. 4,056,270 discloses a demountable boat trailer step including a foot plate having a pair of parallel slots adjacent each end and running substantially the full width of the plate, a plurality of bolts, a pair of clamp bars, and a plurality of nuts. The foot plate rests on the top surface of a boat trailer frame member and is demountably attached by means of bolts extending through the slots and engaging clamp bars contacting the undersurface of the frame member. Slots in the foot plate permit mounting on various sizes of frame members. Adapters are provided for attachment of the step to cylindrical frame members.

U.S. Pat. No. 5,738,362 discloses a rotating step for a trailer hitch, which includes a step holding element that is insertable in a receiver-type trailer hitch on a vehicle and that includes a mounting bar for securing into the trailer hitch receiver, and a step rotatably secured to the mounting bar for movement between open and closed positions. The mounting bar has an opening formed with a post mounted therein and the post has two ends, one of which is secured to the step and the other of which has a locking element secured thereto which is normally held in contact with the top surface and the side surfaces of the mounting bar. To operate the step between open and closed positions the step must be first pushed upwardly, away from the mounting bar and the ground on which the vehicle is resting, so that the locking element will be moved out of contact with the mounting bar to enable the step to be rotated between retracted and useable positions, with respect to the rear of the vehicle on which it is mounted.

U.S. Pat. No. 5,799,961 discloses a quick-attachable trailer step that includes a planar step member, two U-shaped mounting brackets fixedly attached to the back end of the step member with the open ends of the mounting brackets being disposed downwardly relative to the top of the step member, and two braces connected to the step member and to the mounting brackets to strengthen the trailer step. Each of the mounting brackets has a first extended portion and a second extended portion spaced from each other and defining a frame-receiving slot between each other, which is adapted to receive the portion of the frame of the trailer. The closed end of the mounting brackets essentially rest upon a portion of the frame of the trailer with the step member being disposed essentially horizontally outwardly from the trailer.

U.S. Pat. No. 6,170,843 discloses a trailer hitch step that includes a step holding member having a first end which is insertable into a receiver-type trailer hitch and a second end which is adapted for holding a step member for stepping onto the tailgate of a pickup truck. In another embodiment of the invention the step holding member telescopes in and out towards a side of a pickup truck allowing for easy storage when telescoped in. In a third embodiment the step holding member folds inwards from the pickup towards the trailer hitch for storage. A fourth embodiment is adapted for mounting directly onto a trailer hitch drawbar so that the hitch may be used for towing with the step in place for use.

U.S. Pat. No. 6,511,086 discloses a foldable step assembly that is adjustably engageable with a trailer hitch receiver to achieve a variable horizontal clearance between a step plate and a rearward end of the receiver. The step plate is pivotally mounted to a step mount shank and is foldable from a horizontal use position to a vertical storage position. The step plate has a latch receiving recess, and there is a latch mechanism mounted on an upper part of the of a facing plate on the step mount shank. A brake light is mounted on the step plate to be visible when the step plate is in the vertical storage position.

U.S. Pat. No. 7,390,003 discloses a step apparatus for a trailer that includes a rod that has a first end and a second end. The rod has a bend therein positioned between the first and second ends so that a first portion and a second portion of the rod is defined. A bracket is configured to be releasably securable to a trailer arm. A pair of plates is attached to and extends outwardly from the bracket. Each of the plates has an aperture extending therethrough. The apertures are aligned with each other. A rigid panel has a top side and a bottom side. A plurality of fasteners is provided. Each of the fasteners is extendable through the panel and into one of a plurality of openings extending through the first portion. The bracket is attached to the trailer arm so that the plates are horizontally orientated. The second portion is extended through the apertures.

U.S. Pat. No. 9,487,146 discloses a trailer hitch step apparatus including a hollow square-shaped hitch sleeve, with a perimeter of a channel of the hitch sleeve substantially conforming to a perimeter of a trailer hitch receiver. A base mounting support is attached to a bottom side of the hitch sleeve. Each of a right step member and a left step member of a pair of step members is attached to a right area and a left area, respectively, of the base mounting support. Each of a right side mounting support and a left side mounting support of a pair of triangular side mounting supports is disposed on a side edge of the right step member and the left step member, respectively. The channel of the hitch sleeve is selectively slidably disposable around the trailer hitch receiver, and a tightening bolt secures the channel of the hitch sleeve around the trailer hitch receiver.

U.S. Pat. No. 10,518,708 discloses a trailer, retractable stair assembly, and method of operating same. The trailer includes a frame that defines an interior cavity. A retractable stair assembly is movable between a stowed position in which the retractable stair assembly is positioned within the interior cavity and a deployed position in which the retractable stair assembly extends out of the trailer frame to establish a plurality of steps out of the trailer to an egress surface.

U.S. Pat. No. 10,710,508 discloses an extendable/retractable step assembly mounted at the rear assembly of a flatbed trailer to permit access to and from the ground to the flatbed trailer. The extendable/retractable stair assembly includes a pair of steps that are staggered and can be extended out of the rear assembly during use and then retracted therein when not in use. The steps can be manually extended/retracted or they can be automatically controlled. A safety interlock is also disclosed to automatically retract the steps when the trailer emergency brakes are released.

None of these devices or systems provide the safety, convenience, and efficiency that would benefit a driver of such a vehicle for multiple mounting actions to access the trailer of the truck in a workday. Therefore, a need is still felt for a device that provides a safe and secure stepping surface and is adapted to being detachably mounted to a crossbar of a vehicle, such as the lower crossbar at the rear of a trailer.

BRIEF SUMMARY

According to various example embodiments of the present general inventive concept, a step assembly is provided to be readily attachable to a crossbar of a vehicle and selectively deployable to aid drivers or other workers to be able to conveniently access the bed of the vehicle.

Additional aspects and advantages of the present general inventive concept will be set forth in part in the description which follows, and, in part, will be obvious from the description, or may be learned by practice of the present general inventive concept.

The foregoing and/or other aspects and advantages of the present general inventive concept may be achieved by providing a step assembly to be attached to a crossbar of a vehicle, the step assembly including a base subassembly including first and second side brackets configured to be coupled to an upper surface of a crossbar of a vehicle, and a stair subassembly including a plurality of step members arranged between first and second side members, wherein proximal ends of each of the first and second side members are configured to be rotatably coupled to the respective first and second side brackets such that the stair subassembly is selectively rotatable between a deployed position and a stored position.

Other features and aspects may be apparent from the following detailed description, the drawings, and the claims.

BRIEF DESCRIPTION OF THE FIGURES

The following example embodiments are representative of example techniques and structures designed to carry out the objects of the present general inventive concept, but the present general inventive concept is not limited to these example embodiments. In the accompanying drawings and illustrations, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying drawings in which.

DETAILED DESCRIPTION

Figure 1:
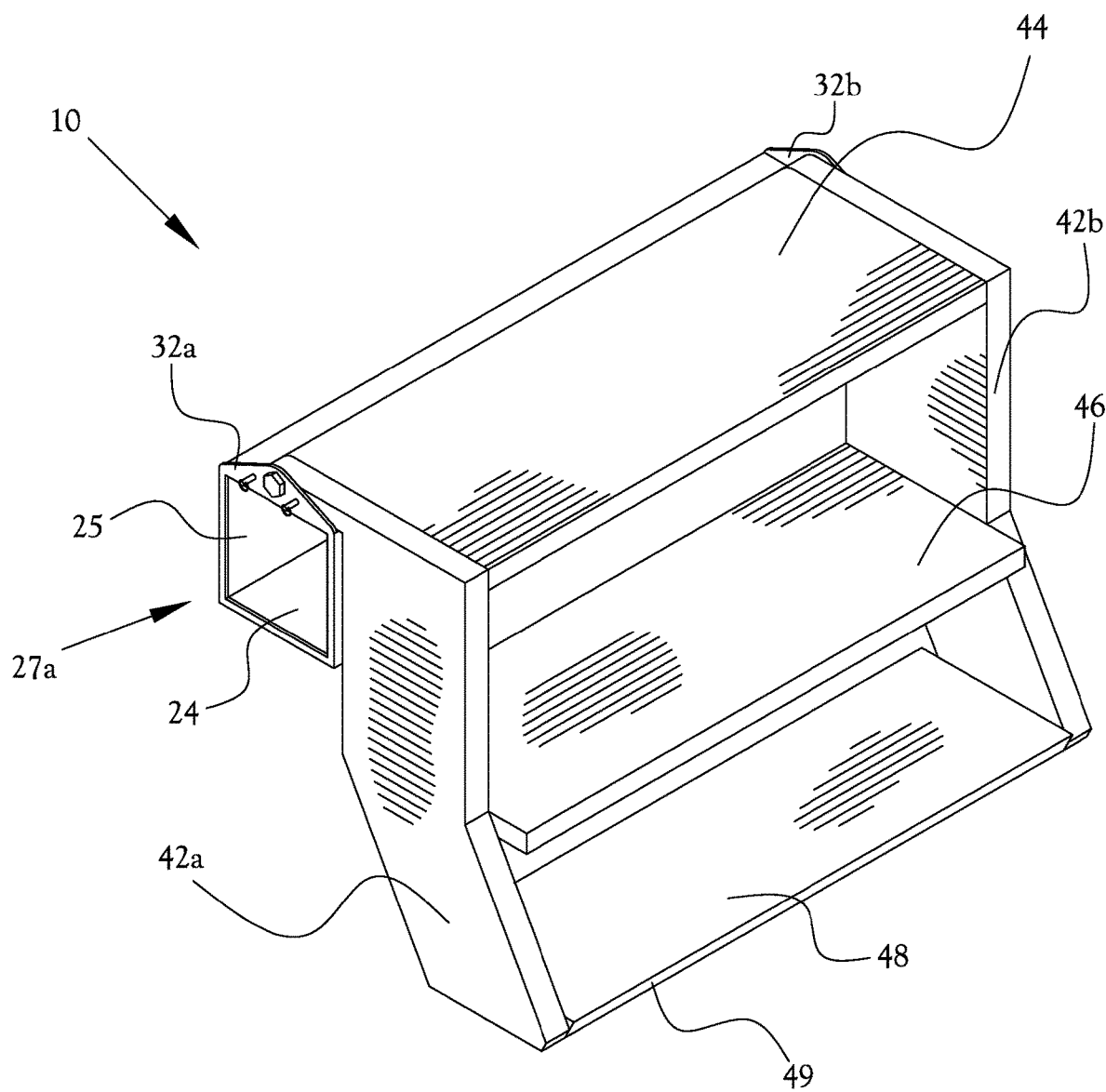
FIG. 1 illustrates a step assembly according to an example embodiment of the present general inventive concept.

Reference will now be made to the example embodiments of the present general inventive concept, examples of which are illustrated in the accompanying drawings and illustrations. The example embodiments are described herein in order to explain the present general inventive concept by referring to the figures.

The following detailed description is provided to assist the reader in gaining a comprehensive understanding of the structures and fabrication techniques described herein. Accordingly, various changes, modification, and equivalents of the structures and fabrication techniques described herein will be suggested to those of ordinary skill in the art. The progression of fabrication operations described are merely examples, however, and the sequence type of operations is not limited to that set forth herein and may be changed as is known in the art, with the exception of operations necessarily occurring in a certain order. Also, description of well-known functions and constructions may be simplified and/or omitted for increased clarity and conciseness.

Note that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. Spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The present general inventive concept pertains generally to step apparatuses and, more particularly, to attachable step assemblies adapted to being mounted to a vehicle component to provide a stepping surface assisting in accessing a part of the vehicle. Various example embodiments of the present general inventive concept assist drivers or others in safely accessing the rear of a trailer, van (an enclosed semi-trailer), flatbed (an open trailer), etc., when other methods of access are not convenient or available. The existing approach to accessing such a trailer is to walk up and remove any locking devices, while standing on the ground, that have secured the trailer rear doors. In the case of a van, those doors may be roll-up or swinging. Typically, the worker then triggers the safety latch and lifts up on the clasp, if it is a rollup door, or unlocks and swings open the hinged type doors back to the side of the truck, and then climbs up into the van or onto the flatbed to prepare and disembark the freight. The step assemblies of various example embodiments of the present general inventive concept provide a safe, convenient, and easily accessible way of accessing the bed of the truck or van. In various example embodiments here, the terms step assembly and stair assembly may be used interchangeably.

In broad terms, the present general inventive concept, in some of its various example embodiments and aspects, may generally include a base adapted to be fitted to or slidably mounted onto one of the rear crossbars of a vehicle or trailer. A stair subassembly with multiple step members is pivotally connected to the base, such that the stair subassembly may rotate into a deployed setting or position when needed, thereby providing multiple stepping surfaces providing access to a portion of the vehicle above the crossbar, e.g., the bed of a trailer. In various example embodiments, the step assembly includes one or more tightening bolts to help secure the hollow sleeve to the crossbar. Moreover, in various example embodiments, the step assembly may include a safety locking device to secure the stair subassembly in place when it is being used or when it is being stored. The step members generally may be rated to support at least 300 pounds of weight per step member, and, in various example embodiments, the step members are fabricated so as to be slip-resistant. Components of the assembly generally may be fabricated from stainless steel, carbon steel, A36 carbon steel, galvanized steel, aluminum, fiberglass, or similar materials. In some example embodiments the base includes a hollow sleeve having a substantially square profile or cross-section, which is compatible with the substantially square profile or cross-section of most vehicle crossbars. The square hollow sleeve thus surrounds the crossbar on four sides.

Figure 2:
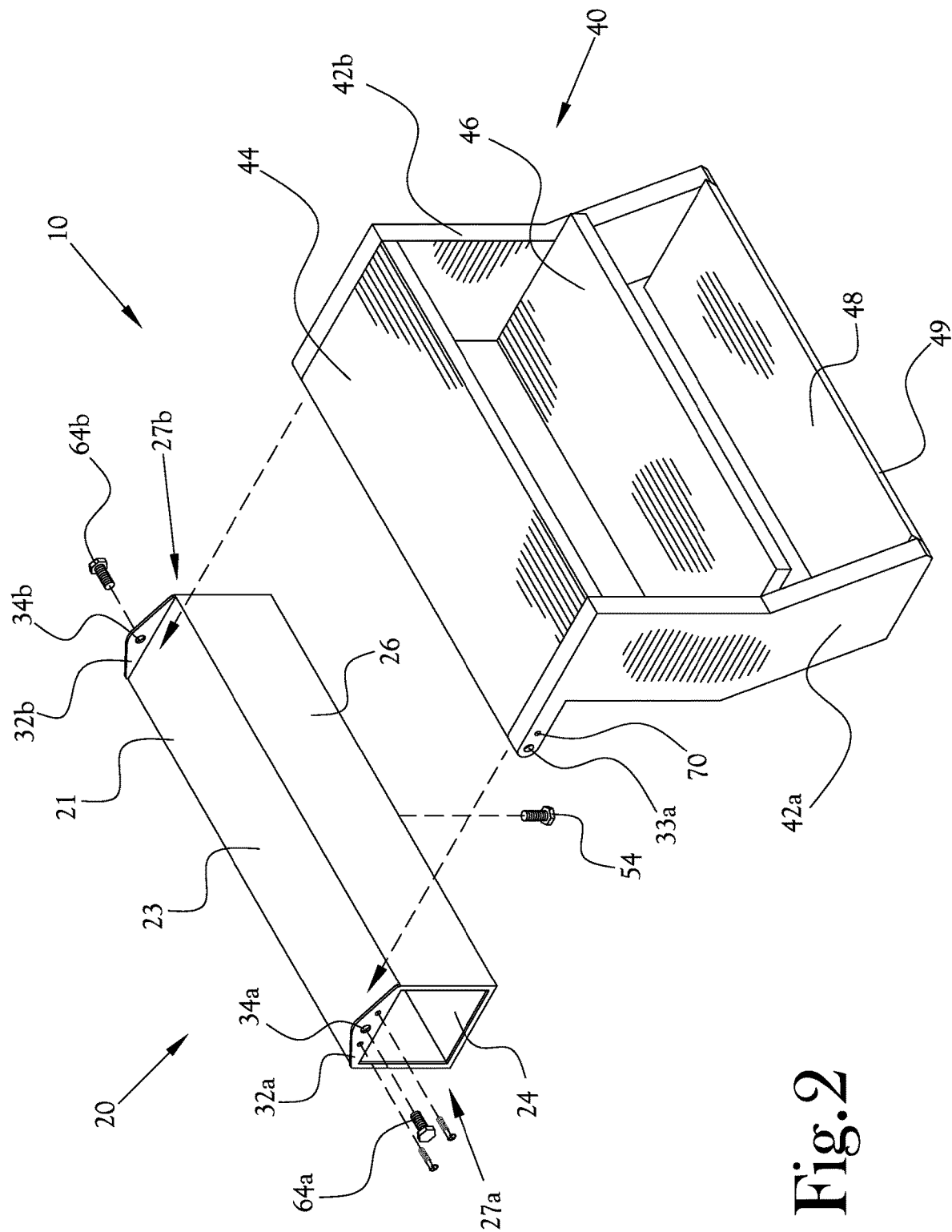
FIG. 2 illustrates the step assembly of FIG. 1 in a partially exploded form.

FIG. 1 illustrates a step assembly according to an example embodiment of the present general inventive concept, and FIG. 2 illustrates the step assembly of FIG. 1 in a partially exploded form. In the step assembly 10 of FIGS. 1-2, a base subassembly 20 is configured to be fitted to a crossbar of a vehicle, and a stair subassembly 40 is configured to be rotatably coupled to the base subassembly 20. In this example embodiment, the base subassembly 20 includes a hollow sleeve 21 adapted to fit around the crossbar of a vehicle (such as a truck), and generally has a substantially square cross-section. The hollow sleeve 21 includes a top side 23, a bottom side 24, a front side 25, and back side 26, as shown in FIG. 1 and in the exploded view in FIG. 2. Each of the top side 23, bottom side 24, front side 25, and back side 26 includes an internal surface and an external surface.

The top side 23, bottom side 24, front side 25, and back side 26 collectively define an open left end 27a and an open right end 27b of the hollow sleeve 21, and the top side 23, bottom side 24, front side 25, and back side 26 further collectively define a channel 28 between the open left end 27a and the open right end 27b of the hollow sleeve 21. The hollow sleeve 21 is shaped and sized such that it is adapted to receive and fit around the crossbar of a vehicle. The base subassembly 20 further generally includes at least two brackets, a left-side bracket 32a and a right-side bracket 32b, generally affixed to an external surface of one of the sides of the hollow sleeve 21, generally (but not always) the top side 23. These brackets may be referred to as shoulder brackets, or simply shoulders, in some of the descriptions herein. In some example embodiments (as in the illustrated example embodiment), the hollow sleeve 21 has a substantially square profile or cross-section, which is compatible with the substantially square profile or cross-section of most vehicle crossbars. When slidably mounted to the crossbar of a vehicle, the hollow sleeve 21 surrounds the crossbar on four sides. Thus, in this example embodiment, the hollow sleeve 21 may be formed in one piece that can be simply slid over an end of the crossbar and into the desired position on the crossbar.

In the example embodiment illustrated in FIGS. 1-2, the stair subassembly 40 generally includes two side members, a left side member 42a and a right side member 42b. The stair subassembly 40 may further include at least two step members positioned between the side members 42a and 42b. In the illustrated example embodiment, the stair subassembly 40 includes three step members: a top step member 44, a middle step member 46, and a bottom step member 48. Each step member has a length dimension and a width dimension, with each step member having a first end at one extremity of the length dimension and a second end at an opposing extremity of the length dimension; each step member is connected to the left side member 42a and the right side member 42b, with each step member's first end being in contact with the left side member 42a and each step member's second end being in contact with the right side member 42b. Each step member includes at least one top edge and at least one bottom edge. Each step member includes a stepping surface. In the illustrated example embodiment, the bottom step member 48 includes a clipped nose 49 on its outboard bottom edge to allow clearance when used with some trailers. The step members may be prefabricated and welded to the side members. The step members may be non-slip/skid perforated, and may be formed of 316 stainless steel, aluminum, or other structural material.

Figure 3A:
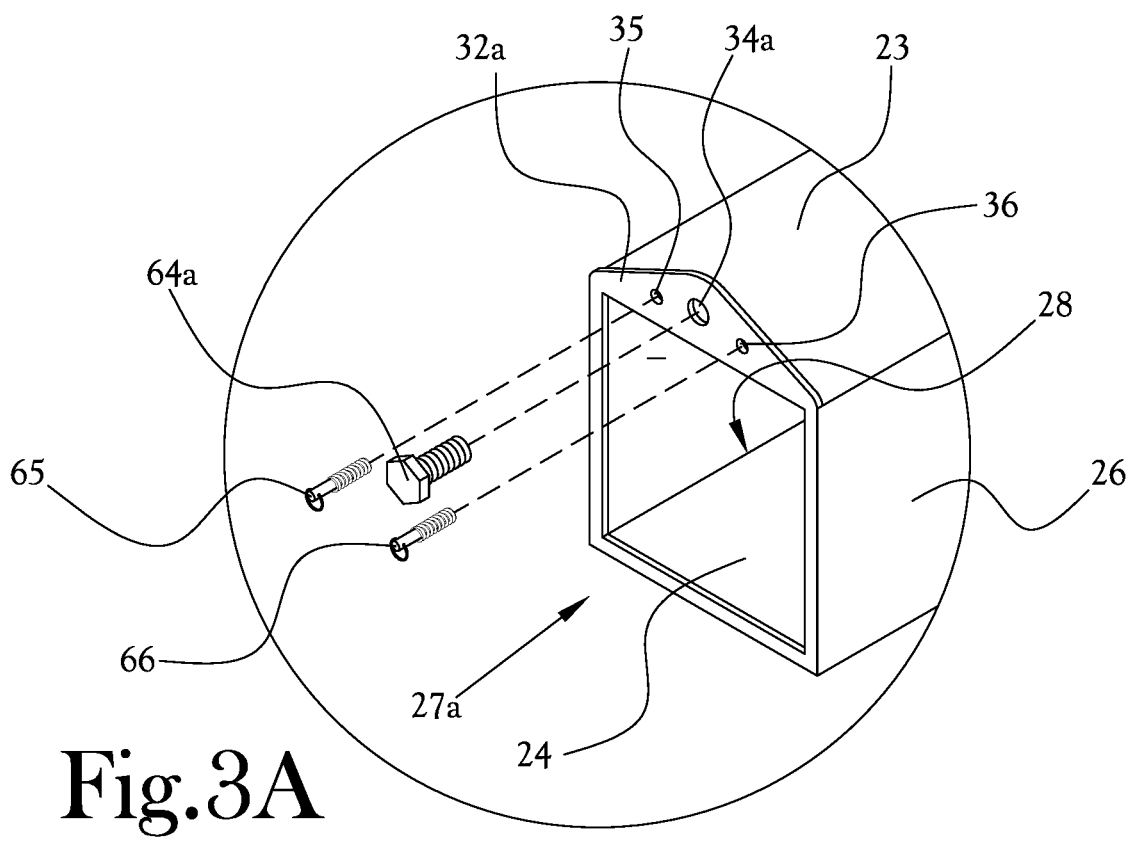
FIGS. 3A-B illustrate portions of the base assembly of FIGS. 1-2.
Figure 3B:
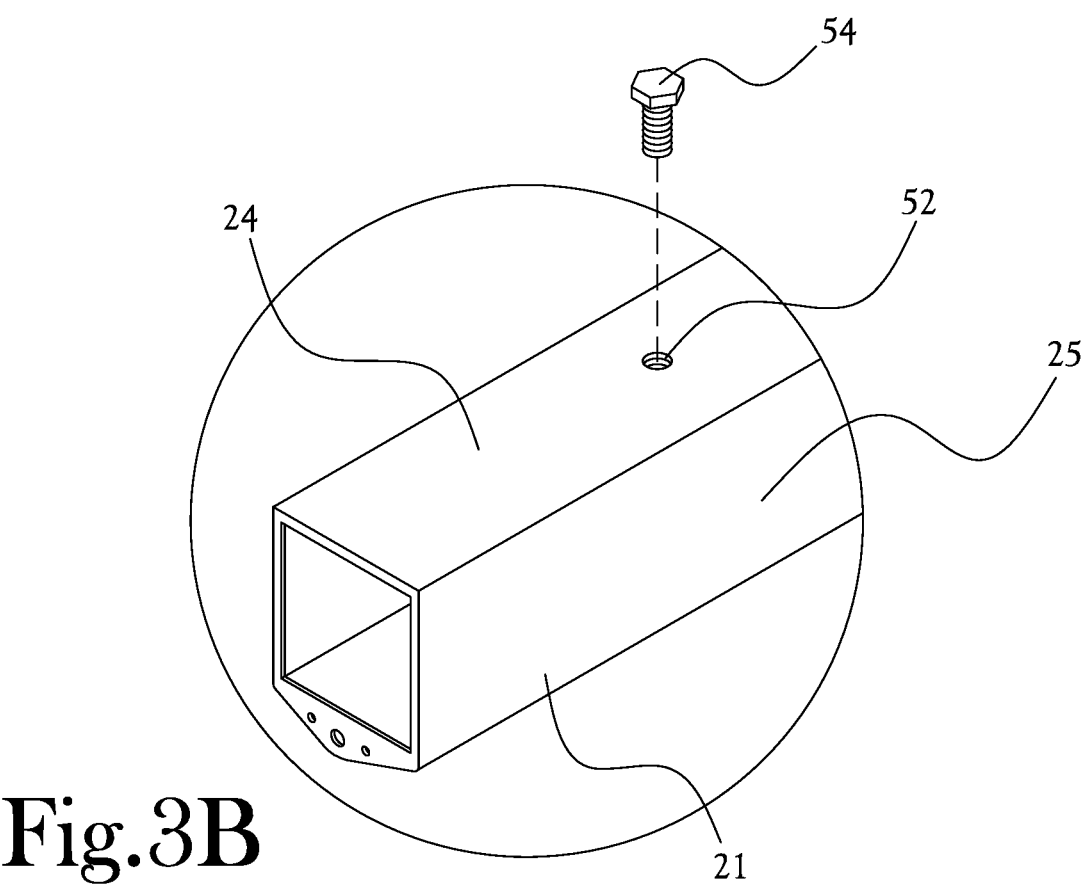

As illustrated in FIGS. 1 and 2, the left side member 42a and right side member 42b each include a length dimension, a width dimension, and a depth dimension; and both the left side member 42a and the right side member 42b each include a proximal end proximate one extremity of the length dimension, and a distal end proximate an opposing extremity of the length dimension. As shown in the illustrated example embodiment, the left side member 42a and the right side member 42b extend from the base subassembly 20 such that the length dimension of the left side member 42a and the length dimension of the right side member 42b are substantially parallel. Each side member includes a portion, proximate the proximal end of the side member, that connects with one of the brackets at a pivot point: that is, the left side member 42a is connected to the left-side bracket 32a of the base subassembly 20 at a left-side pivot point such that the left side member 42a is able to rotate around the left-side pivot point; and the right side member 42b is connected to the right-side bracket 32b of the base subassembly 20 at a right-side pivot point such that the right side member 42b is able to rotate around the right-side pivot point. FIGS. 3A-B illustrate portions of the base assembly of FIGS. 1-2. Generally, pivot bolts 64a and 64b connect each bracket to its corresponding side member (as seen in the exploded view in FIG. 2 and in the close-up view in FIG. 3A), and the side member then rotates about that bolt as the pivot point and axis of rotation. In various example embodiments the pivot bolts may be ½ inch fasteners or bolts provided with washers, lock washers, and lock nuts. Pivot bolt 64a passes through pivot hole or aperture 34a in the left side bracket 32a, and through pivot aperture 33a in the left side member 42a, to form the pivot point on the left side of the step assembly 10. In various example embodiments the pivot aperture 33a may be a detent, and may depend upon the thickness of the side members of the stair subassembly. Pivot bolt 64b passes through pivot aperture 34b in the right side bracket 32b, and through pivot aperture 33b (not shown) in the right side member 42b, to form the pivot point on the right side of the step assembly 10. As illustrated in FIGS. 1-2, the proximal ends of the left and right side members 42a,42b extend generally in the shape of the back portion of the top step member 44, with the pivot apertures 33a,33b proximate the back end thereof. A portion of the side members 42a,42b extending between the top step member 44 and the middle step member 46 may be configured to extend straight down when the assembly 10 is in the deployed position, and a back edge of that portion of the side members may contact the back side 26 of the sleeve 21 to brace the step or stair subassembly 40 against the sleeve 21 when in use. The extension, or lip, at the proximal end of the side members may also be configured to lay substantially flat along the top side 23 of the sleeve 21 to provide support when in the deployed position. The distal ends of the side members 42a,42b may be configured to angle back away from sleeve 21 when deployed, so that the bottom step member 48 is located further back than the middle step member 46, to more approximate a stair form. Similarly, the middle step member 46 may extend back from the side members and away from the sleeve 21 to also more effectively approximate a stair formation.

Figure 4:
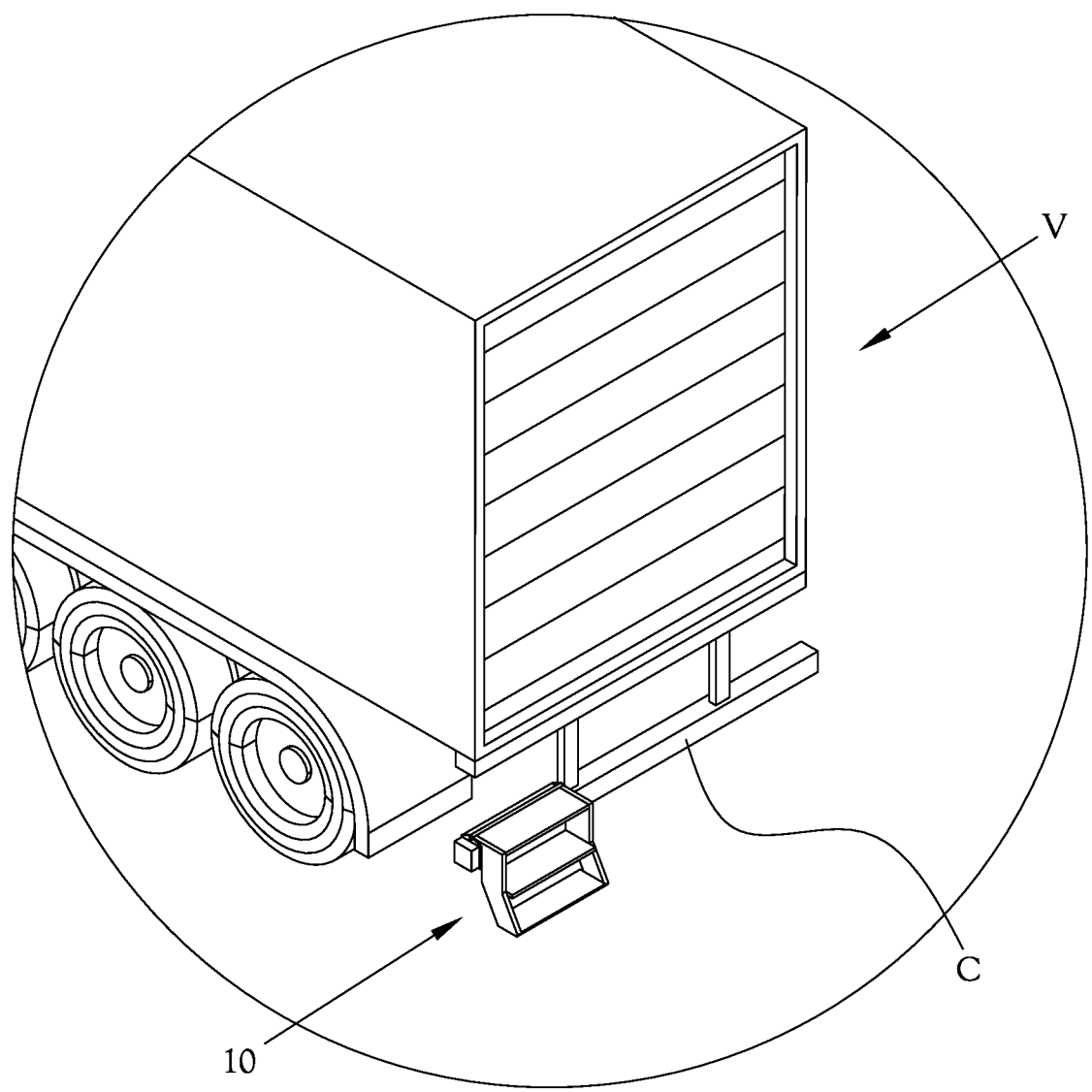
FIG. 4 illustrates the step assembly of FIG. 1 coupled to a crossbar of a vehicle, and deployed for use.

FIG. 4 illustrates the step assembly of FIG. 1 coupled to a crossbar of a vehicle, and deployed for use. As illustrated in FIG. 4, the step assembly 10 has been slidably mounted onto the lower crossbar C of a vehicle V. In this position, a driver, user, etc., can safely and easily use the stair formation of the steps to climb up to the bed of the vehicle. In various example embodiments of the present general inventive concept, the step assembly may be more in the shape of a ladder. As will be described herein in regard to FIGS. 5A-5B, when the step assembly 10 is not in use, it can be stowed away in a vertical position that may be tucked under the trailer portion of the vehicle, so as to be effectively out of sight. In various example embodiments of the present general inventive concept, the steps may be 4.5 inches deep and 0.5 inches thick, and configured to be non-skid at least on top surfaces thereof. As illustrated in FIG. 1, the bottom step member 48 may have a clipped nose 49 on the outermost portion to help prevent contact with the trailer when the assembly is in the stored position.

Figure 5A:
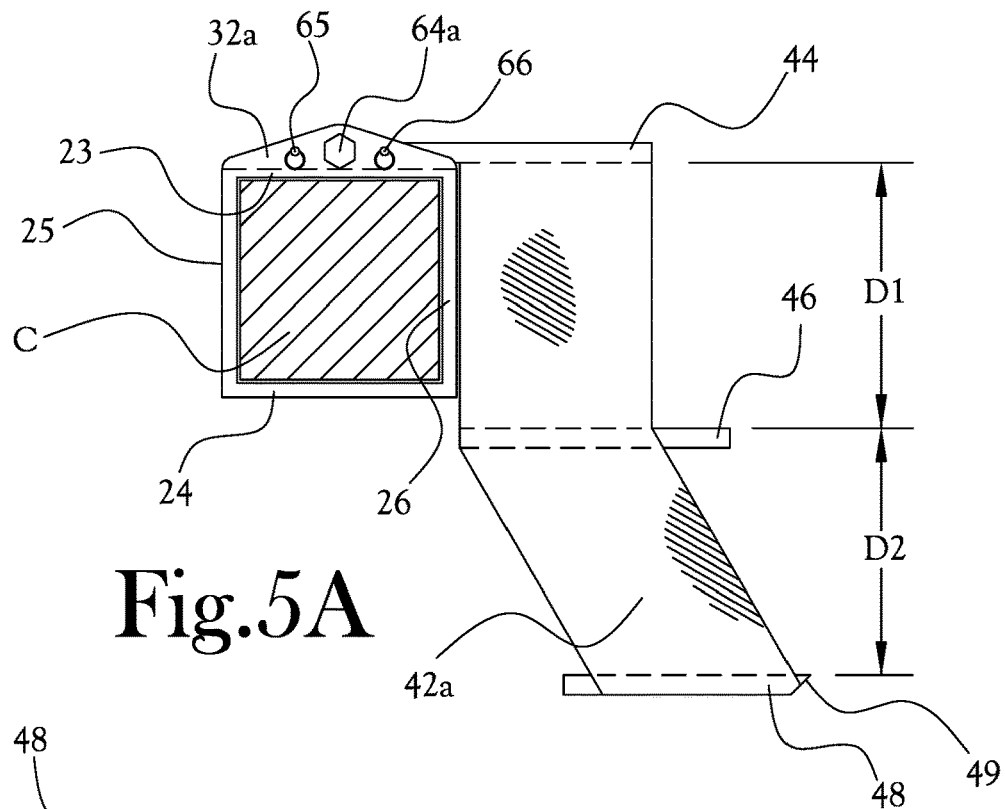
FIGS. 5A-B illustrate side views of the step assembly of FIG. 1 in respective deployed and stored positions.
Figure 5B:
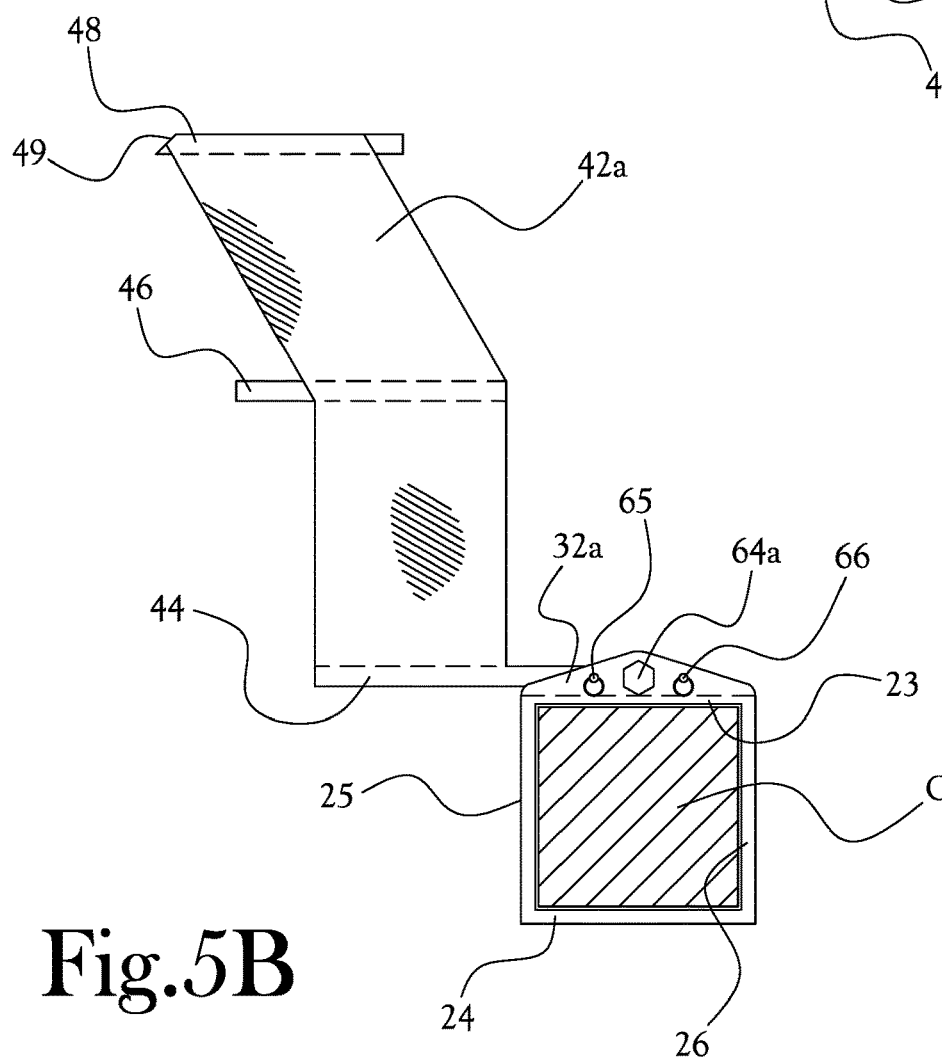

FIGS. 5A-B illustrate side views of the step assembly of FIG. 1 in respective deployed and stored positions. The stair subassembly 40 is selectively switchable between the deployed position illustrated in FIG. 5A, and the stored position illustrated in FIG. 5B. In the deployed setting, when the assembly 10 is in use with a vehicle and the hollow sleeve 21 is fitted around a crossbar of the vehicle, the side members 42a and 42b extend generally away and down from the base subassembly 20, with the stepping surfaces of the step members 44, 46, 48 oriented generally up and away from the surface upon which the vehicle is resting. In this setting, the step members 44, 46, 48 are thereby positioned and oriented such that they are ready to serve as steps for a user. To switch from the deployed setting to the stored setting, the distal ends of the side members 42a and 42b are raised so that the stair subassembly 40 rotates around the pivot points located on or near the brackets 32a and 32b, whereby the stair subassembly 40 is rotated approximately 180 degrees relative to its position in the deployed setting, and the side members 42a and 42b are generally positioned above the base assembly 20. In the deployed position, a portion of the bottom surface of the top step member 44 may rest on the top side 23 of the sleeve 21. In the stored position, a portion of the top surface of the top step member 44 (which faces downward in the stored position) may rest on the top side 23 of the sleeve 21. In various example embodiments the lip at the proximal end of the side members of the stair subassembly is configured with a rounded end which facilitates the rotation of the stair subassembly between the deployed and stored positions and allow the top step member 44 to at least partially contact the top side of the sleeve in either of the position, while reducing contact between the lip and the sleeve during rotation. The stair subassembly 40 is configured such that there is a distance or separation between the step members of the stair subassembly 40. In various example embodiments of the present general inventive concept, when the stair subassembly 40 is in the deployed setting, the vertical distance D1 between the bottom edge of the top step member 44 and the stepping surface of the middle step member 46 (indicated in FIG. 5A) may be generally from 11 and 12 inches, from 8 to 12 inches, or the like. Similarly, when the stair subassembly 40 is in the deployed setting, the vertical distance D2 between the bottom edge of the middle step member 46 and the stepping surface of the bottom step member 48 (indicated in FIG. 5A) may be generally from 11 and 12 inches, from 8 to 12 inches, or the like. In some embodiments, D1 may be equal to D2.

As seen in FIG. 2 and in FIG. 3A, the brackets 32a and 32b include pivot holes 34a and 34b adapted to respectively receive the pivot bolts 64a and 64b that pivotally connect the brackets 32a and 32b to the side members 42a and 42b. Additionally, in several example embodiments, including the illustrated example embodiment, at least one of the brackets includes a device safety lock mechanism adapted to hold the stair subassembly 40 in place and inhibit undesired movement of the stair subassembly 40 when not being intentionally switched between the stored setting and deployed setting. In the illustrated example embodiment, the device safety lock mechanism includes two spring-loaded pins 65 and 66, located on opposing sides of the left-side pivot bolt 64a. The spring-loaded pins 65 and 66 are respectively adapted to fit through locking apertures 35 and 36 located in the left-side bracket, and each spring-loaded pin is adapted to work with a safety detent 70 located on the left side member 42a near the pivot aperture 33a. When the stair subassembly 40 is in the deployed setting, as in FIG. 5A, the first spring-loaded pin 66 is engaged and in cooperative contact with the safety detent 70 on the left side member 42a. When the stair subassembly 40 is in the stored setting, as in FIG. 5B, which perforce entails a substantially 180-degree rotation of the left side member 42a about the pivot point, the safety detent 70 on the left side member 42a also rotates about the pivot point, and in this position the second spring-loaded pin 65 is engaged and in cooperative contact with the safety detent 70. In this way, in both the stored setting and the deployed setting, the device safety lock mechanism secures the stair subassembly 40 in place and inhibits undesired movement of the stair subassembly 40. Those of skill in the art will recognize that other forms, styles, and configurations of device safety lock mechanisms are possible and are compatible with various example embodiments of the present general inventive concept, and those other forms, styles, and configurations of device safety lock mechanisms are contemplated by and fall within the scope of the present general inventive concept. In various example embodiments the safety detent 70 may pass completely through the side member of the stair subassembly, which may be dependent upon the thickness of the side walls of the stair subassembly. In various example embodiments spring-loaded pins and safety detents may be provided on both sides of the assembly.

In the illustrated example embodiment, and in various other example embodiments of the present general inventive concept, the base subassembly 20 may include a tightening bolt that assists in holding the hollow sleeve 21 in place on the crossbar C when the assembly 10 is in use or to be used. As shown in the close-up view in FIG. 3B and in the exploded view in FIG. 2, the bottom side 24 of the hollow sleeve 21 may include a threaded aperture 52 configured to receive a tightening bolt 54. Typically, the tightening bolt 54 enters the threaded aperture 52 from a position facing the external surface of the bottom side 24 of the hollow sleeve 21. When the hollow sleeve 21 is slidably mounted around the crossbar C and is in position to be used to provide a stepping surface, the tightening bolt 54 is manipulated by being turned such that an end of the tightening bolt 54 passes through the threaded aperture 52 and thereby passes through the full thickness of the bottom side 24 of the hollow sleeve 21. The distal end of the tightening bolt 54, having passed through the bottom side 24 of the hollow sleeve 21, then makes contact with the crossbar C. At the same time, the internal surface of the top side 23 of the hollow sleeve 21 is resting upon and by its weight exerting pressure upon the crossbar. As the tightening bolt 54 applies pressure from below, the top side 23 of the hollow sleeve 21 remains in contact with the crossbar C, and the tightening bolt 54 and top side 23 cooperate to establish and maintain a secure pressure fit on the crossbar C, effectively clamping the hollow sleeve 21 to the crossbar C. In this way, the tightening bolt 54 helps to secure the assembly 10 to the crossbar C. In the illustrated example embodiment, the tightening bolt 54 is located on the bottom side 24 of the hollow sleeve. However, other configurations are possible and are contemplated by the present general inventive concept. Some example embodiments may locate two or more tightening bolts on the bottom side 24 of the hollow sleeve 21. Some example embodiments may locate one or more tightening bolts on either the front side 25 or back side 26 of the hollow sleeve. Some example embodiments may locate one or more tightening bolts on any of the sides of the hollow sleeve 21, or on all of them simultaneously. These and other configurations, some of which may be apparent to those of skill in the art, are contemplated by the present general inventive concept and fall within the scope of the present general inventive concept. Further, in some example embodiments, one or more inner surfaces of one or more of the side members of the hollow sleeve is coated, or partially coated, with polyurethane or a similar substance, or includes an insert comprising polyurethane or a similar substance. This coating or insert cushions the crossbar within the hollow sleeve, helping to stabilize the assembly when slidably mounted onto the crossbar and preventing or minimizing wear and damage to the crossbar.

Figure 6A:
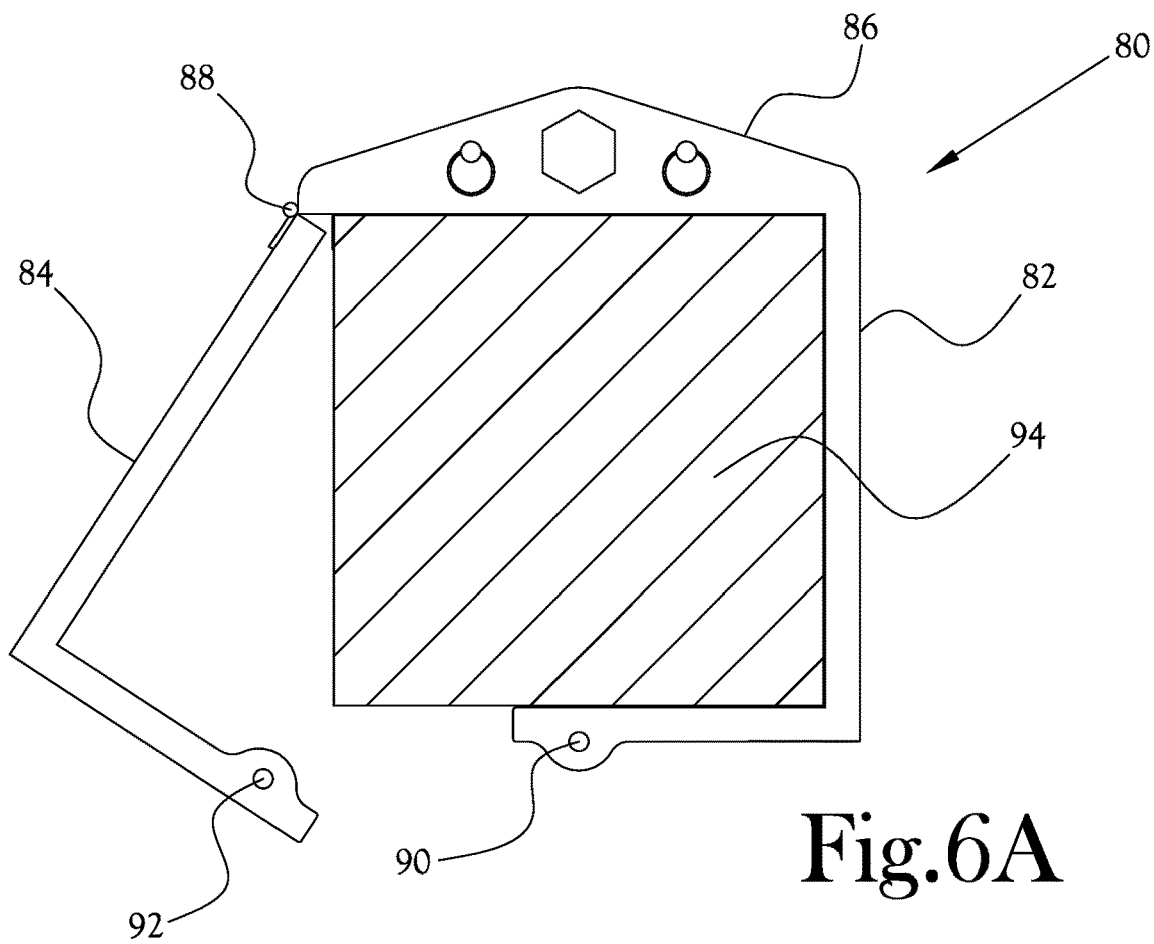
FIGS. 6A-B illustrate a side view of a base assembly for a step assembly according to another example embodiment of the present general inventive concept.
Figure 6B:
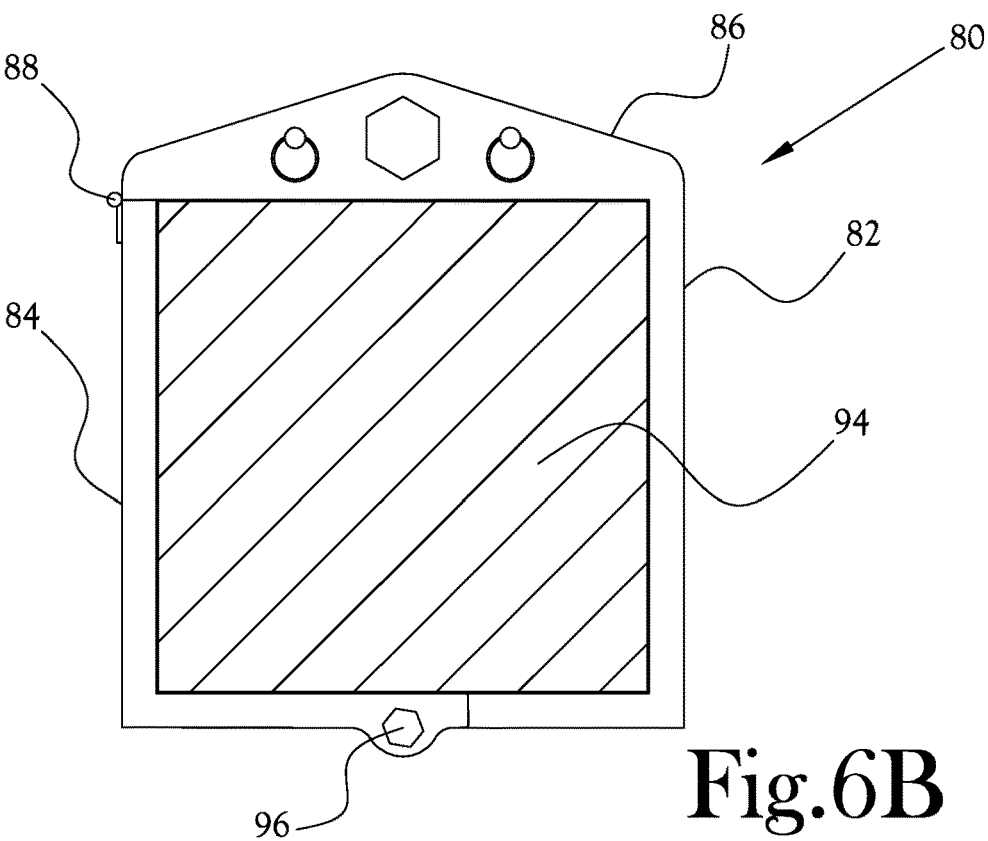

Various other example embodiments of the present general inventive concept may provide a host of differently configured base subassemblies and/or stair subassemblies without departing from the scope of the present general inventive concept. For example, FIGS. 6A-B illustrate a side view of a base subassembly for a step assembly according to another example embodiment of the present general inventive concept. While the base subassembly 20 of FIGS. 1-2 may be essentially formed as one piece to be slipped over a crossbar of a vehicle, the base subassembly 80 of FIGS. 6A-B is formed of two pieces that are coupled together proximate edges thereof so as to be able to wrap around the crossbar at any desired portion of the crossbar. In this example embodiment the base subassembly 80 has interior and exterior surfaces that may be substantially similar to the base subassembly 20 when fully connected around the illustrated crossbar 94. However, the subassembly 80 includes a first portion 82 that includes a shoulder bracket 86, and a second portion 84 that is configured to be coupled to the first portion 82 proximate a top edge of the second portion 84, and then further secured to the first portion at a location under the crossbar 94. It is understood that various other two-piece constructions may have a host of different configurations without departing from the scope of the present general inventive concept. In this description, the conventions established in the description of FIG. 2 will be maintained, in which the rearmost surface of the crossbar relative to the vehicle will be referred to as the back side, and the frontmost surface of the crossbar relative to the vehicle will be referred to as the front side. The first portion 82 includes the shoulder bracket 86 that is formed with substantially the same features of the left side bracket 32a of FIG. 2. A front side of the first portion 82 is configured to extend from the bracket 86 and terminate proximate the top corner of the front surface of the crossbar 94, and a back side of the first portion extends from the bracket 86 downward along the back surface of the crossbar 94, and wraps partially around the bottom surface of the crossbar 94. The first portion 82 is provided with a bolt-hole 90 proximate the terminus of the back side under the crossbar 94. The second portion 84 is configured to be rotatably coupled to the end of the first side of the first portion 82 by, for example, a selectively interlocking arrangement, or a hinge member 88 (as illustrated) so that the second portion 84 is pivotable about that point. The second portion 84 is configured to extend down along the front surface of the crossbar 94, and around the bottom surface of the crossbar 94 to meet the end of the first portion 82. The second portion 84 is provided with a bolt-hole 92 that is configured to register with the bolt-hole 90 of the first portion 82 so that the base subassembly 80 can be secured around the crossbar 94. Various example embodiments may include the hinge member 88 or other similar coupling member that allows such a pivoting movement, and other example embodiments may provided an interlocking connection so that the first and second portions may be selectively not joined together when not in use. FIG. 6A shows a state of the base subassembly 80 in which the first portion 82 has been placed over the crossbar 94, and FIG. 6B shows a state of the base subassembly 80 in which the second portion 84 has been pivoted around so that the bolt-holes 90,92 are in register, and in which a pin or bolt 96 has been passed through to fix the base subassembly 80 to the crossbar 94. The connection and terminus points of the first and second portions 82,84 may be altered without departing from the scope of the present general inventive concept. Once assembled, this base subassembly 80 may be used with the stair subassembly as previously described.

Figure 7:
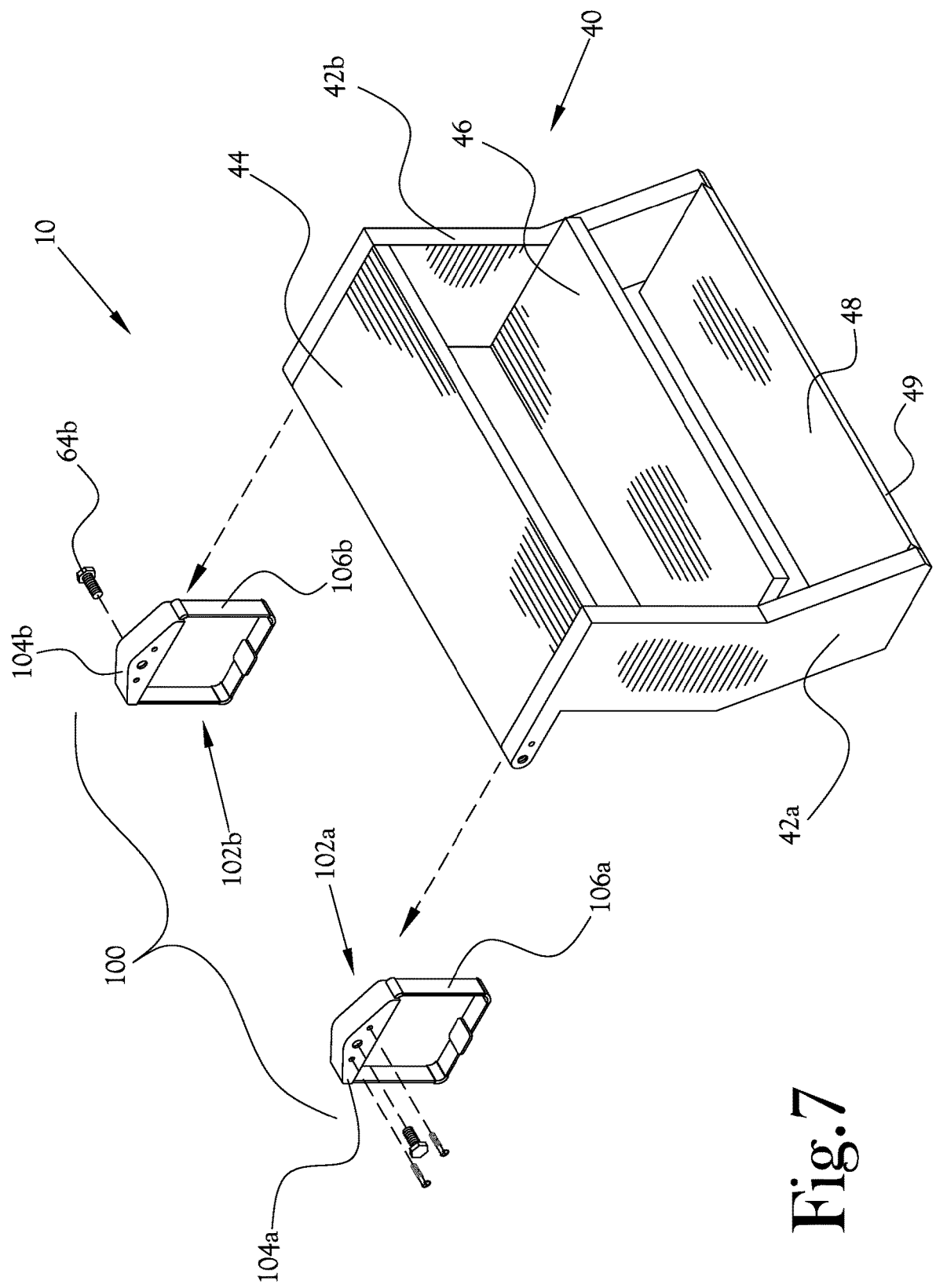
FIG. 7 illustrates a perspective view of a base assembly for a step assembly according to yet another example embodiment of the present general inventive concept.
Figure 8:
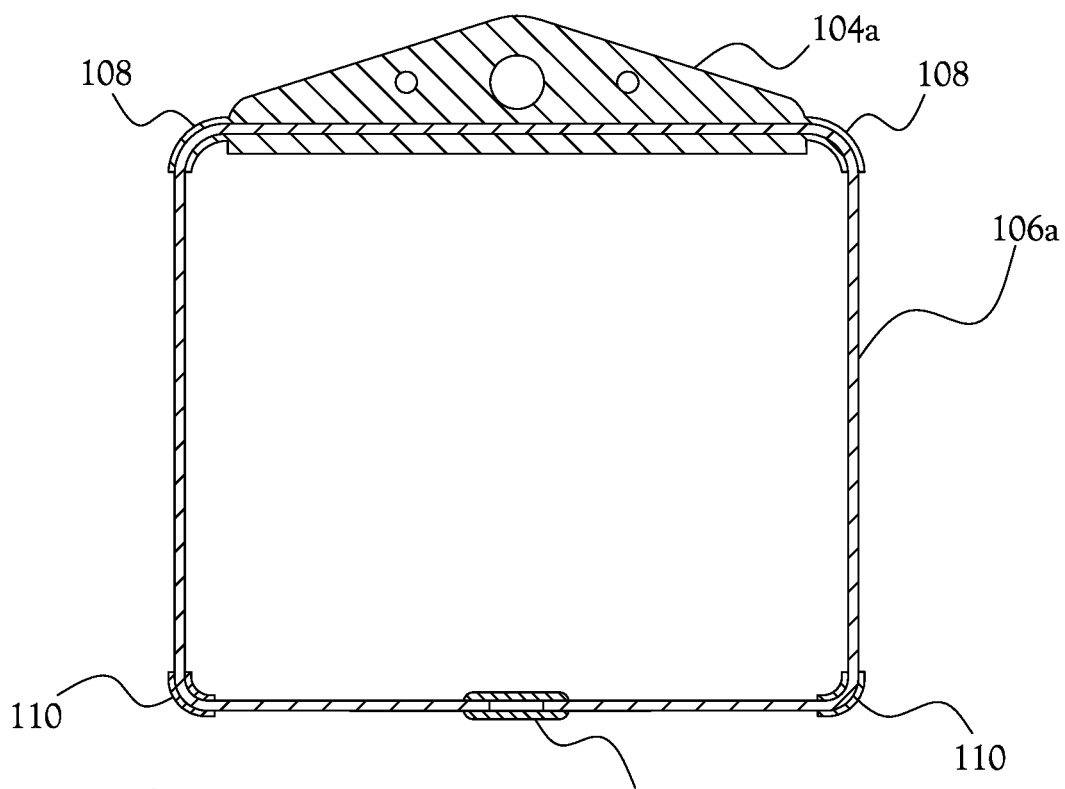
FIG. 8 illustrates a side view of a portion of the base assembly of FIG. 7.

FIG. 7 illustrates a perspective view of a base subassembly for a step assembly according to yet another example embodiment of the present general inventive concept, and FIG. 8 illustrates a side view of a portion of the base subassembly of FIG. 7. In the example embodiment of FIGS. 7-8, a base subassembly 100 includes bracket portions 102a,102b that are configured to be independently fixed to the crossbar of a vehicle. As illustrated in FIGS. 7-8, each of the bracket portions 102a,102b respectively include brackets 104a,104b that are configured to be positioned on the upper surface of the crossbar, and then secured in place by straps 106a,106b. As shown in FIG. 8, the bracket 104a is configured to sit on a top surface of a crossbar, and such that the strap 106a passes therethrough. First and second ends of the strap 106a are configured to be secured to one another by a strap lock 112 proximate a bottom surface of the crossbar in this illustrated embodiment, but may be joined at other locations in various other example embodiments. In the example embodiment illustrated in FIG. 8, first and second ends of the strap 106a are fixed to one another with the strap lock 112 to securely hold the strap 106a at a desired tension. Various example embodiments may employ a host of differently configured strap locks to hold the tension in the strap. In various example embodiments two top corner guards 108 and two bottom corner guards 110 are provided and configured such that the strap 106a passes therethrough and the corner guards 108,110 can be held in place on the corners of the crossbar to provide a gap for protection between the strap 106a and the crossbar when tension is applied to secure the base subassembly 100 to the crossbar. The corner guards may be formed with urethane or other similar materials to maintain a shield between the strap and crossbar to prevent wear to the crossbar and the strap. In various example embodiments the top corner guards may be formed with the bracket, and may be formed of the same material as the bracket. However, in example embodiments which do not include corner guards integrated with the bracket, differently sized crossbars may be accommodated more readily due to the movable corner guards along the strap. In some example embodiments the strap may be formed with a readily pliable material, in which case a buckling member may be provided instead of a strap lock, and in other example embodiments the strap may be formed with rigid material. For example, in some example embodiments the strap may be ½ inch wide by 0.25-0.3 inch 316 stainless steel strapping which is fastened by a strap lock at the bottom. In such an embodiment the bracket may have the top corner members integrally formed of the same material.

Figure 9:
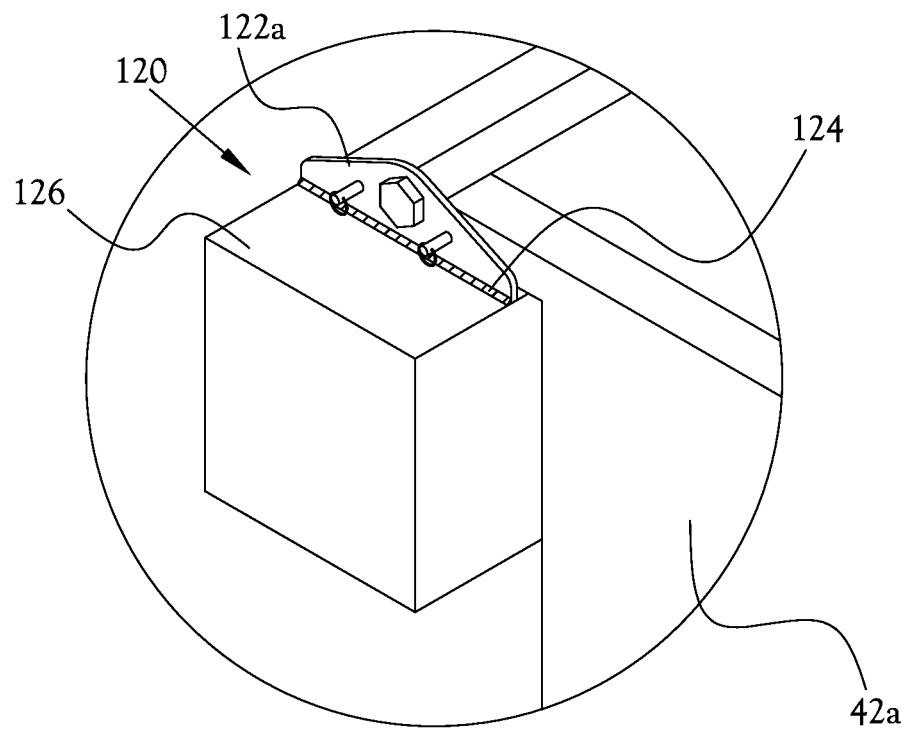
FIG. 9 illustrates a perspective view of a base assembly for a step assembly according to still another example embodiment of the present general inventive concept.

FIG. 9 illustrates a perspective view of a base subassembly for a step assembly according to still another example embodiment of the present general inventive concept. In the example embodiment illustrated in FIG. 9 a base subassembly 120 includes brackets 122a and 122b (not shown) that are welded directly to the crossbar 126. As illustrated in FIG. 9, the bracket 122a is formed substantially similar to other brackets described herein, but a weld joint 124 has been formed to fix the bracket 122a directly to the crossbar 126. Once thusly fixed, the stair subassembly may be used with the brackets 122a and 122b in much the same fashion as the other example embodiments described herein.

Various example embodiments of the present general inventive concept provide a secure stepping surface and is adapted to being detachably mounted to a crossbar of a vehicle, such as the lower crossbar at the rear of a trailer, and to surround the crossbar on four sides. Also, in various example embodiments, the assembly, when mounted onto a vehicle crossbar and in the deployed setting, provides two or more steps (each rated at 300 pounds) available to the driver to assist the driver in gaining safe access to the trailer. The assembly, while in service, generally provides a step to access the trailer within 11 to 12 inches of the ground or driving surface (i.e., the surface upon which the trailer is parked), in lieu of the 20-26 inches from the ground or driving surface to the crossbar, which is typical of truck trailers. Further, in many embodiments, a step member is located further to the rear from the trailer than the crossbar to which the base subassembly is attached. This placement allows the driver's weight to work to hold him or her in place (rather than just straight down), resulting in a more balanced, safe, and comfortable working position for a driver using the assembly.

Various example embodiments of the present general inventive concept may be made up of six parts, and the materials used to fabricate the assembly can be of a variety of materials such as A36 carbon steel, aluminum, fiberglass, etc. The materials may be chosen so as to be capable of supporting a minimum of 300 pounds per step, and each step may be made of a material that is slip resistant or may have a slip resistant coating or member on the top surface. Some example embodiments of the base include two pieces to allow clamping around an existing crossbar, and the two pieces may not be uniform. In example embodiments a first piece will have a set of brackets or shoulders that function roughly as the top of the base and location of the pivot point for the stair assembly. The first piece may have one edge that will interlock with a second piece on one side of the crossbar, and another edge that will bolt together with another edge of the second pieces at another point about the crossbar, thus locking the base in place. The stair assembly may include left and right brackets that serve as the sides of the step assembly, and which connect to the base with two non-corrosive bolts, nuts, flat and lock washers, etc. Two treads with non-slip holes punched into them may also have a hole in one end where these brackets connect to the base. The shoulder may support the step portion of the assembly in an up or down position via a spring actuated locking pin that holds the stair portion in place when not in use, and which may also hold the stair portion in place when in use.

Various example embodiments of the present general inventive concept may provide a step assembly to be attached to a crossbar of a vehicle, the step assembly including a base subassembly including first and second side brackets configured to be coupled to an upper surface of a crossbar of a vehicle, and a stair subassembly including a plurality of step members arranged between first and second side members, wherein proximal ends of each of the first and second side members are configured to be rotatably coupled to the respective first and second side brackets such that the stair subassembly is selectively rotatable between a deployed position and a stored position. Each of the first and second side brackets may be formed with a bracket pivot aperture, each of the first and second side members may be formed with a side member pivot aperture proximate the proximal ends, and the respective bracket pivot apertures and side member pivot apertures may be configured to be placed in register to receive a pivot securing pin to form a rotatable coupling between the side brackets and side members. At least one of the first and second side brackets may be formed with a first locking aperture, at least one of the first and second side members may be formed with a detent proximate the proximal end, and the first locking aperture and detent may be configured to be placed in register to receive a stored securing pin to hold the stair subassembly in place in the stored position. The at least one of the first and second side brackets may be formed with a second locking aperture configured to be placed in register with the detent to receive a deployed securing pin to hold the stair subassembly in place in the deployed position. The stored securing pin may be a spring-loaded pin that is affixed to the at least one of the first and second side brackets. The stair subassembly may extend back and down from the crossbar when in the deployed position, and the stair subassembly may extend up and forward from the crossbar when in the stored position. The step members may include a top step member proximate the proximal ends of the first and second side members, a portion of a first surface of the top step member may be located above the crossbar when in the deployed position, and a portion of a second surface of the top stem member, opposite the first surface, may be located above the crossbar when in the stored position. The first and second side members may be configured such that any lower step member is arranged to be positioned further back from the crossbar than any higher step member when in the deployed position. Each of the proximal ends of the first and second side members may be configured as a lip extending along a portion of a corresponding one of the step members so as to provide clearance around the crossbar during rotation of the stair subassembly. Respective portions of the first and second side members proximate the proximal ends may be configured to rest proximate a rearmost surface of the crossbar to provide structural support in the deployed position. The first and side brackets may be welded directly to the crossbar. The base subassembly may include a sleeve that is configured to surround the crossbar along a length of the sleeve, and the first and second side brackets may extend upward from a top surface of the sleeve. The sleeve may be formed of a single-piece construction configured to be slipped over an end of the crossbar and fixed at a desired position. The base subassembly may further include at least one tightening bolt and a corresponding tightening bolt aperture formed in the sleeve to receive the at least one tightening bolt such that the at least one tightening bolt contacts the crossbar upon being turned to fix the sleeve in place. The sleeve may be formed of a first member that surrounds a first portion of the crossbar along the length of the sleeve, and a second member that surrounds a second portion of the crossbar along the length of the sleeve, the second member having a first edge configured to be rotatably coupled to a first edge of the first member, and a second edge configured to be secured to a second edge of the first member by a fixing member. The first edges of the first and second members may be configured to be selectively interlocked to one another. The base subassembly may further include a first strap configured to couple the first side bracket to the crossbar, and a second strap configured to couple the second side bracket to the crossbar, wherein each of the first and second side brackets may be configured to pass the respective first and second straps through a portion thereof, and the first and second straps may be configured to wrap around the crossbar to hold the side brackets in place. Each of the first and second straps may have first and second ends that are secured to one another by a strap lock at an underside of the crossbar. The base subassembly may further include top and bottom corner guards configured to pass the respective first and second straps therethrough so as to be provide a space between the straps and corners of the crossbar. The straps may be formed of metal, and the top and bottom corner guards may be formed of urethane.

Various example embodiments of the present general inventive concept may provide a step assembly to operate with a crossbar of a vehicle to permit step access to a portion on the vehicle from a walking surface, the step assembly including a base subassembly including a hollow sleeve having a top side, a bottom side, a front side, and a back side, the sleeve defining a left-side opening, a right-side opening, and a channel disposed between the left-side opening and the right-side opening, the sleeve being adapted to be slidably mounted onto the vehicle crossbar and to rest upon the vehicle crossbar; and a pair of brackets affixed to an exterior surface of the sleeve, the pair of brackets including a left-side bracket and a right-side bracket, the left-side bracket being affixed to an exterior surface of the sleeve proximate the left-side opening, and the right-side bracket being affixed to an exterior surface of the sleeve proximate the right-side opening; and a stair subassembly including a pair of side members, including a left side member and a right side member, each side member having a length dimension, a width dimension, a depth dimension, a proximal end proximate one extremity of the length dimension, and a distal end proximate an opposing extremity of the length dimension, the proximal end of the left side member being connected to the left-side bracket of the base subassembly at a left-side pivot point such that the left side member is able to move in an arc around the left-side pivot point, and the proximal end of the right side member being connected to the right-side bracket of the base subassembly at a right-side pivot point such that the right side member is able to move in an arc around the right-side pivot point, the left side member and the right side member extending from the base subassembly such that the length dimension of the left side member and the length dimension of the right side member are substantially parallel; and at least two step members positioned between the side members, each step member having a length dimension and a width dimension, each step member having a first end at one extremity of the step's length dimension and a second end at an opposing extremity of the step's length dimension, each the step member being connected to the left side member and the right side member, each step member's first end being in contact with the left side member and each step member's second end being in contact with the right side member, each step member having a stepping surface; wherein the stair subassembly is switchable between a stored setting and a deployed setting when the hollow sleeve is slidably mounted over and resting upon the vehicle crossbar, with stair subassembly rotating about the left-side pivot point and right-side pivot point between the stored setting, in which the distal ends of the side members are elevated, and the deployed setting, in which the distal ends of the side members are positioned proximate the walking surface and the stepping surfaces of the steps are oriented permit step access to a portion on the vehicle. Some embodiments may further include a tightening bolt adapted to engage the crossbar and secure the base subassembly to the crossbar. Some embodiments may further include multiple tightening bolts. Some embodiments may further include a safety locking device adapted to secure the stair subassembly in place when engaged. In some embodiments, the safety locking device may include a spring-loaded component. In some embodiments, the step members may be fabricated so as to be slip-resistant. In some embodiments, the step members may be formed with stainless steel, carbon steel, A36 carbon steel, galvanized steel, aluminum, or fiberglass.

In some embodiments, the stair subassembly may be formed with stainless steel, carbon steel, A36 carbon steel, galvanized steel, aluminum, or fiberglass. In some embodiments, the base member may be formed with stainless steel, carbon steel, A36 carbon steel, or galvanized steel. In some embodiments, the hollow sleeve may be formed with polyurethane on a surface of the hollow sleeve that is in contact with the crossbar when the hollow sleeve is slidably mounted to the crossbar.

Numerous variations, modifications, and additional embodiments are possible, and accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated.

It is noted that the simplified diagrams and drawings included in the present application do not illustrate all the various connections and assemblies of the various components, however, those skilled in the art will understand how to implement such connections and assemblies, based on the illustrated components, figures, and descriptions provided herein, using sound engineering judgment. Numerous variations, modification, and additional embodiments are possible, and, accordingly, all such variations, modifications, and embodiments are to be regarded as being within the spirit and scope of the present general inventive concept.

While the present general inventive concept has been illustrated by description of several example embodiments, and while the illustrative embodiments have been described in detail, it is not the intention of the applicant to restrict or in any way limit the scope of the general inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings. Additional modifications will readily appear to those skilled in the art. Accordingly, departures may be made from such details without departing from the spirit or scope of applicant's general inventive concept.

The invention claimed is:

1. A step assembly to be attached to a crossbar of a vehicle, the step assembly comprising:
   a base subassembly including first and second side brackets configured to be coupled to an upper surface of a crossbar of a vehicle, wherein at least one of the first and second side brackets is formed with a first locking aperture; and
   a stair subassembly including a plurality of step members arranged between first and second side members, at least one of the first and second side members being formed with a detent proximate the proximal end;
   wherein proximal ends of each of the first and second side members are configured to be rotatably coupled to the respective first and second side brackets such that the stair subassembly is selectively rotatable between a deployed position and a stored position, the first locking aperture and detent being configured to be placed in register to receive a stored securing pin to hold the stair subassembly in place in the stored position;
   wherein at least one of the first and second side brackets is formed with a second locking aperture configured to be placed in register with the detent to receive a deployed securing pin to hold the stair subassembly in place in the deployed position.

2. The step assembly of claim 1, wherein each of the first and second side brackets is formed with a bracket pivot aperture,
   each of the first and second side members is formed with a side member pivot aperture proximate the proximal ends, and
   the respective bracket pivot apertures and side member pivot apertures are configured to be placed in register to receive a pivot securing pin to form a rotatable coupling between the side brackets and side members.

3. The step assembly of claim 1, wherein the stored securing pin is a spring-loaded pin that is affixed to the at least one of the first and second side brackets.

4. The step assembly of claim 1, wherein the stair subassembly extends back and down from the crossbar when in the deployed position, and
   the stair subassembly extends up and forward from the crossbar when in the stored position.

5. The step assembly of claim 1, wherein the step members include a top step member proximate the proximal ends of the first and second side members,
   a portion of a first surface of the top step member is located above the crossbar when in the deployed position, and
   a portion of a second surface of the top stem member, opposite the first surface, is located above the crossbar when in the stored position.

6. The step assembly of claim 1, wherein the first and second side members are configured such that any lower step member is arranged to be positioned further back from the crossbar than any higher step member when in the deployed position.

7. The step assembly of claim 1, wherein each of the proximal ends of the first and second side members are configured as a lip extending along a portion of a corresponding one of the step members so as to provide clearance around the crossbar during rotation of the stair subassembly.

8. The step assembly of claim 7, wherein respective portions of the first and second side members proximate the proximal ends are configured to rest proximate a rearmost surface of the crossbar to provide structural support in the deployed position.

9. The step assembly of claim 1, wherein the first and side brackets are welded directly to the crossbar.

10. The step assembly of claim 1, wherein the base subassembly includes a sleeve that is configured to surround the crossbar along a length of the sleeve, and
    the first and second side brackets extend upward from a top surface of the sleeve.

11. The step assembly of claim 10, wherein the sleeve is formed of a single-piece construction configured to be slipped over an end of the crossbar and fixed at a desired position.

12. The step assembly of claim 11, wherein the base subassembly further comprises at least one tightening bolt and a corresponding tightening bolt aperture formed in the sleeve to receive the at least one tightening bolt such that the at least one tightening bolt contacts the crossbar upon being turned to fix the sleeve in place.

13. The step assembly of claim 10, wherein the sleeve is formed of a first member that surrounds a first portion of the crossbar along the length of the sleeve, and a second member that surrounds a second portion of the crossbar along the length of the sleeve, the second member having a first edge configured to be rotatably coupled to a first edge of the first member, and a second edge configured to be secured to a second edge of the first member by a fixing member.

14. The step assembly of claim 13, wherein the first edges of the first and second members are configured to be selectively interlocked to one another.

15. The step assembly of claim 1, wherein the base subassembly further comprises:
   a first strap configured to couple the first side bracket to the crossbar; and
   a second strap configured to couple the second side bracket to the crossbar;
   wherein each of the first and second side brackets are configured to pass the respective first and second straps through a portion thereof, and
   the first and second straps are configured to wrap around the crossbar to hold the side brackets in place.

16. The step assembly of claim 15, wherein each of the first and second straps have first and second ends that are secured to one another by a strap lock at an underside of the crossbar.

17. The step assembly of claim 15, wherein the base subassembly further comprises top and bottom corner guards configured to pass the respective first and second straps therethrough so as to be provide a space between the straps and corners of the crossbar.

18. The step assembly of claim 17, wherein the straps are formed of metal, and the top and bottom corner guards are formed of urethane.

\* \* \* \* \*